United States Patent
Wise et al.

(10) Patent No.: US 9,927,814 B2
(45) Date of Patent: Mar. 27, 2018

(54) SYSTEM AND METHOD FOR LOCALIZATION OF ROBOTS

(71) Applicant: Fetch Robotics, Inc., San Jose, CA (US)

(72) Inventors: Melonee Wise, San Jose, CA (US); Michael Ferguson, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 124 days.

(21) Appl. No.: 15/082,488

(22) Filed: Mar. 28, 2016

(65) Prior Publication Data
US 2017/0276501 A1 Sep. 28, 2017

(51) Int. Cl.
G01C 21/00 (2006.01)
G05D 1/02 (2006.01)
G01C 21/20 (2006.01)

(52) U.S. Cl.
CPC .......... *G05D 1/0274* (2013.01); *G01C 21/20* (2013.01)

(58) Field of Classification Search
CPC .... G01C 21/3446; Y10S 90/01; G05D 1/0274
USPC .............. 701/26, 522, 532, 2, 461; 901/7; 700/245, 258, 259
See application file for complete search history.

(56) References Cited

U.S. PATENT DOCUMENTS

| | | | |
|---|---|---|---|
| 8,688,275 B1 | 4/2014 | LaFary et al. | |
| 8,965,579 B2 * | 2/2015 | Wang | B25J 9/1689 700/259 |
| 9,037,396 B2 * | 5/2015 | Pack | G01C 21/30 701/409 |
| 9,358,975 B1 | 6/2016 | Watts | |
| 2006/0041331 A1 * | 2/2006 | Myeong | G06K 9/00664 700/245 |
| 2008/0086236 A1 * | 4/2008 | Saito | G01S 5/0252 700/245 |
| 2011/0054689 A1 * | 3/2011 | Nielsen | G05D 1/0088 700/258 |
| 2012/0121161 A1 * | 5/2012 | Eade | G09B 29/007 382/153 |
| 2014/0129027 A1 * | 5/2014 | Schnittman | G05D 1/0219 700/253 |

(Continued)

OTHER PUBLICATIONS

Park, Jong Jin and Benjamin Kuipers, A Smooth Control Law for Graceful Motion of Differential Wheeled Mobile Robots in 2D Environment, Proceedings—IEEE International Conference on Robotics and Automation, Apr. 2011, 2011 IEEE International Conference on Robotics and Automation (ICRA-11).

(Continued)

*Primary Examiner* — Gertrude Arthur Jeanglaude
(74) *Attorney, Agent, or Firm* — J. Steven Svoboda (57) ABSTRACT

A method for localization of robots in a territory of interest includes: providing a mobile robot comprising a processor configured to compute an estimated pose of the mobile robot in a map of a territory of interest using a particle filter comprising a particle; updating, by the processor, a pose in the map of the particle; deciding, by the processor, whether to retain the particle for the next cycle of the particle filter or to eliminate the particle for the next cycle of the particle filter; and sampling the particle filter, by the processor, so as to achieve localization of robots in a territory of interest.

93 Claims, 2 Drawing Sheets

(56) References Cited

U.S. PATENT DOCUMENTS

2017/0147003 A1* 5/2017 Karlsson .............. G05D 1/0246

OTHER PUBLICATIONS

Gerkey, Brian P. and Kurt Konolige, Planning and Control in Unstructured Terrain. In Workshop on Path Planning on Costmaps, Proceedings of the IEEE International Conference on Robotics and Automation, Jan. 2008 (ICRA, 2008).
Arras, Kal O, Oscar Martinez Mozos, and Wolfram Burgard, Using Boosted Features for the Detection of People in 2D Range Data, 2007 IEEE International Conference on Robotics and Automation, ICRA 2007, Rome, Italy, Apr. 10-14, 2007.
Thrun, Sebastian, Wolfram Burgard, and Dieter Fox, Probabilistic Robots, The MIT Press, Cambridge, Massachusetts, 2005, pp. 97-113.
Fox, Dieter, Wolfram Burgard, and Sebastian Thrun, The Dynamic Window Approach to Collision Avoidance, IEEE Robotics & Automation Magazine, vol. 4, No. 1, 1997.
Freund, Yoav and Robert E. Schapire, A Decision-Theoretic Generalization of On-Line Learning and an Application to Boosting, Journal of Computer and System, vol. 55, pp. 119-139, 1997.

* cited by examiner

SYSTEM AND METHOD FOR LOCALIZATION OF ROBOTS

PRIORITY CLAIM

The present application claims the priority benefit of U.S. provisional patent application No. 62/139,686 filed Mar. 28, 2015 and entitled "System and Method for Localization of Robots," the disclosure of which is incorporated herein by reference.

SUMMARY

Embodiments of this invention relate in general to a system and method for localization of robots.

A method for localization of robots in a territory of interest includes: updating, by a processor configured to compute an estimated pose of the mobile robot in a map of a territory of interest using a particle filter comprising a particle; a pose in the map of the particle; deciding, by the processor, whether to retain the particle for the next cycle of the particle filter or to eliminate the particle for the next cycle of the particle filter; and sampling the particle filter, by the processor, so as to achieve localization of robots in a territory of interest.

A method for localization of robots in a territory of interest includes: building, by a processor configured to compute an estimated pose of the mobile robot in a territory of interest using a particle filter comprising a particle, a map of the territory of interest; updating, by the processor, a pose of the particle in the map; associating, by the processor, the particle with the particle pose; deciding, by the processor, whether to retain the particle for the next cycle of the particle filter or to eliminate the particle for the next cycle of the particle filter; sampling the particle filter, by the processor; and determining, by the processor, that further associating is not required to maintain enough particles for the particle filter to function, so as to achieve localization of robots in a territory of interest.

A system for localization of robots in a territory of interest includes: a mobile robot comprising a processor, the mobile robot further comprising an actuator; and a sensor configured to measure the movement of the mobile robot, wherein the actuator comprises a microprocessor equipped with a program configured to execute steps in a particle-based method for robot localization, the steps comprising: updating, by the processor, a pose in a map of the particle; deciding, by the processor, whether to retain the particle for the next cycle of the particle filter or to eliminate the particle for the next cycle of the particle filter; and sampling the particle filter, by the processor, so as to achieve localization of robots in a territory of interest.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of this invention relate in general to a system and method for localization of robots, and more particularly to a particle-based system and method for robot localization.

The system comprises a mobile robot, one or more sensors, and a microprocessor equipped with a program configured to execute steps in the particle-based method for robot localization. For example, at least one of the one or more sensors comprises a freestanding sensor. For example, the freestanding sensor comprises one or more of a wifi receiver, another wireless technology receiver, and another freestanding sensor. For example, the other wireless technology receiver comprises one or more of a radio-frequency identification (RFID) device, a Zigbee device, and another wireless technology receiver. For example, at least one of the one or more sensors comprises a dedicated sensor comprised in a robot. For example, at least one of the one or more sensors comprises a dedicated sensor located on a robot. For example, the dedicated sensor comprises one or more of a laser scanner, an encoder, a Hall effect sensor, an inertial measurement unit (IMU), and another dedicated sensor. For example, the mobile robot comprises one or more wheels. For example, the mobile robot comprises two or more wheels. For example, the mobile robot comprises mobility hardware other than wheels.

According to embodiments of the invention, one or more of the one or more sensors comprises a device configured to measure the movement of the mobile robot. For example, one or more of the one or more sensors comprises a device configured to measure the movement of the mobile robot using odometry. For example, the mobile robot comprises one or more wheels. For example, the wheeled mobile robot comprises one or more sensors configured to measure movement of one or more of the one or more wheels. For example, a wheeled mobile robot comprises one or more sensors configured to measure movement of two or more of the one or more wheels.

For example, a wheeled mobile robot may comprise a processor. For example, the processor is configured to compute a predicted movement of the mobile robot. For example, the processor is configured to compute the predicted movement of the mobile robot using movement of the wheels. For example, the processor is configured to compute the predicted movement of the mobile robot based on movement of the wheels measured by one or more of the one or more sensors.

According to further embodiments of the invention, the robot may comprise an actuator. For example, the actuator comprises one or more of an appendage, an appendage joint, and a wheel. For example, the appendage comprises one or more of an arm, a leg, and another appendage.

For example, the robot comprises an actuator motor configured to move the actuator. For example, the actuator comprises the actuator motor. For example, the actuator motor is mechanically attached to the actuator. For example, the actuator motor is remotely activated using one or more of a belt and a non-belt power transmission device.

According to still further embodiments of the invention, at least one of the one more actuators comprises a feedback mechanism configured to provide feedback to the actuator. For example, the actuator feedback comprises one or more of information regarding a position of the actuator, information regarding force on the actuator, information regarding a position of the motor, information regarding the operation of the motor, and other actuator feedback. For example, the feedback mechanism providing information regarding force on the actuator comprises one or more of a torque sensor and a tactile sensor.

For example, at least one of the one or more actuators comprises a microprocessor. For example, the robot comprises a robot-level microprocessor that is operably connected with the actuator microprocessors. For example, the robot-level microprocessor is operably connected with the microprocessor. For example, the microprocessor is configured to compute a predicted movement of the actuator using an actuation pattern of the leg. For example, the robot comprises a network sensor. For example, the network sensor is configured to sense presence of a network. For example, the network sensor is configured to sense presence of a wireless network. For example, the network sensor is configured to sense strength of a network. For example, the network sensor is configured to sense strength of a wireless network. For example, the network sensor is configured to sense wireless network strength in one or more wireless frequency bands.

According to embodiments of the invention, the microprocessor associates at least one particle with a particle pose in a map of a territory of interest. For example, a particle pose comprises information regarding one or more of the pose of the robot in three-dimensional space and the orientation of the robot in three-dimensional space. For example, a particle pose further comprises a quaternion describing one or more of the robot's roll, pitch, and yaw. For example, the territory of interest comprises one or more walls. For example, the territory of interest comprises one or more obstacles. For example, the map comprises network data. For example, for at least one particle pose, the network data comprises information regarding a network that a dedicated sensor is predicted to detect.

For at least one particle, a cycle of the particle filter comprises at least three steps that are performed by the processor. For example, the cycle of the particle filter comprises a sampling step, an update step, and a decision step, at least one of which is performed by the processor.

For example, the first step in the cycle of the particle filter comprises an update step. The update step comprises updating a position of at least one particle based on an odometry measurement of the robot. For example, updating comprises leaving a particle in place based on the odometry measurement of the robot. For example, updating comprises translating a particle to a different location based on the odometry measurement of the robot.

For example, the odometry measurement comprises noise generated by a model. For example, the odometry measurement comprises Gaussian noise. For example, one or more of the translational component of the odometry and the rotational component of the odometry comprises Gaussian noise. For example, the Gaussian noise may comprise noise that is predicted in the odometry measurement. For example, the step of updating comprises predicting Gaussian noise. For example, the Gaussian noise may comprise noise that is predicted in the odometry measurement based on collected experimental data.

For example, the second step in the cycle of the particle filter comprises a decision step. The decision step comprises, using one or more choice criteria, deciding whether to retain a particle for the next cycle of the particle filter or to eliminate the particle for the next cycle of the particle filter. For example, the decision step comprises application of two decision criteria.

For example, a decision criterion comprises an obstacle analysis. The obstacle analysis comprises comparing the particle to the map, so as to determine whether the particle has passed through one or more of a wall and another obstacle. For example, if the answer is yes, the particle is eliminated. For example, if the answer is no, the particle is retained. For example, the obstacle analysis comprises a computation of whether a point is in contact with an obstacle. For example, the computation of whether a point is in contact with an obstacle becomes a determination whether a point representing the center of the robot lies inside a bounding volume, the bounding volume comprising a radius of the obstacle inflated by the radius of the mobile robot base. For example, the obstacle analysis comprises removing a particle that passes through an obstacle. For example, the obstacle analysis comprises removing a particle where a wireless network should not be seen.

Figures 1A, 1B:
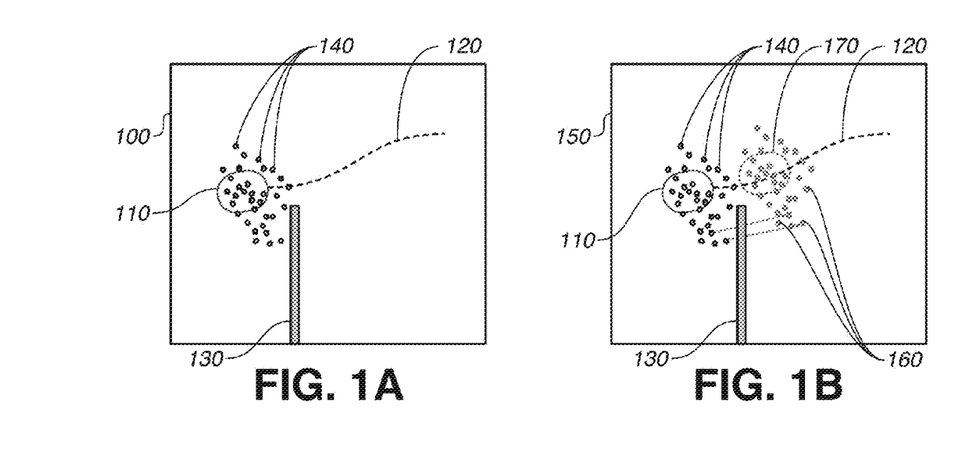
FIGS. 1A-1C are a set of drawings showing update and decision steps performed by the processor in a particle filter cycle in which the update step uses an obstacle analysis pursuant to a system for localization of robots.
Figure 1C:
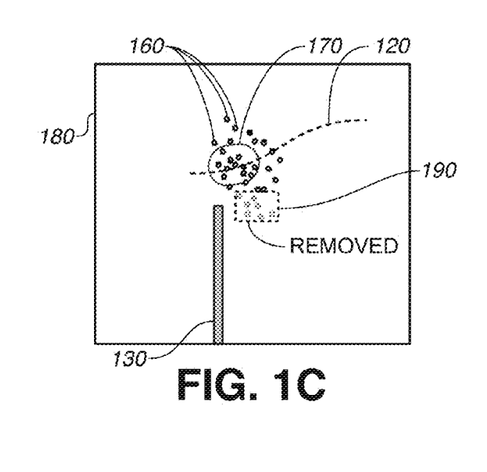

FIGS. 1A-1C are a set of drawings showing update and decision steps performed by the processor in a particle filter cycle in which the update step uses an obstacle analysis. FIG. 1A shows a picture 100 prior to the beginning of a particle filter cycle of a mobile robot in an initial position 110, moving along an estimated trajectory 120. Also shown are a representative obstacle 130, and a number of particle poses 140. In this example, the obstacle 130 comprises a wall 130.

FIG. 1B shows a picture 150 at a first step of the cycle, namely an update step, wherein the pose 140 of at least one particle for the robot in its initial position 110, moving along the estimated trajectory 120, is updated to updated pose 160 based on the odometry of the robot in an updated position 170 and optionally based on noise generated by a model. Preferably, the pose 140 of each particle for the robot in its initial position 110 is updated to updated poses 160 based on the odometry of the robot and optionally based on noise generated by the model. Also shown are the estimated trajectory 120 and the obstacle 130.

FIG. 1C shows a picture 180 at a second step of the particle filter cycle, wherein particles 190 are eliminated from the updated particle poses 160 for the robot's updated position 170, as it moves along the estimated trajectory 120. The eliminated particles 190 comprise those updated particle poses 160 that have passed through one or more of a wall 130 and another obstacle 130.

For example, in carrying out the obstacle analysis, a size of one or more obstacles may be inflated. For example, for purposes of the decision step, the size of the one or more obstacles may be inflated by an approximate radius of a base of the mobile robot. For example, computation of whether a point is in contact with an obstacle becomes a determination whether a point whether a point representing the center of the robot lies inside a bounding volume, the bounding volume comprising a radius of the obstacle inflated by the radius of the mobile robot base.

Figures 2A, 2B:
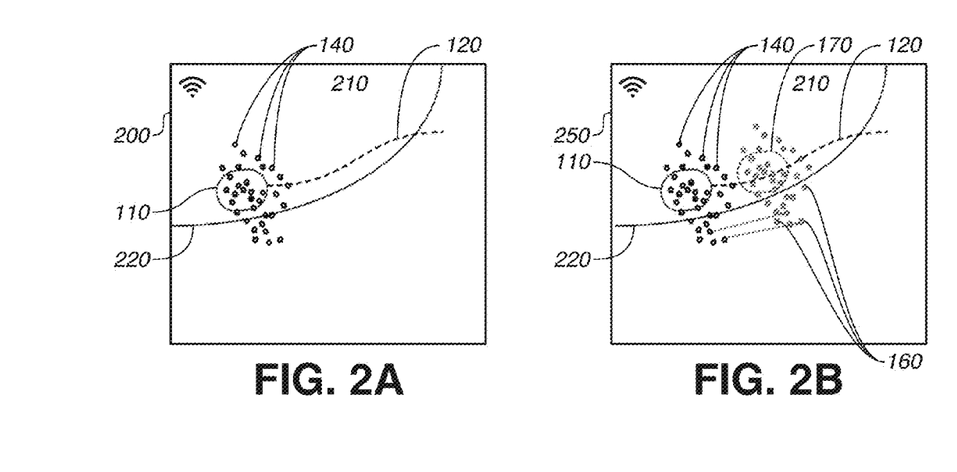
FIGS. 2A-2C are a set of drawings showing update and decision steps performed by the processor in a particle filter cycle in which the update step uses a network analysis pursuant to a system for localization of robots.
Figure 2C:
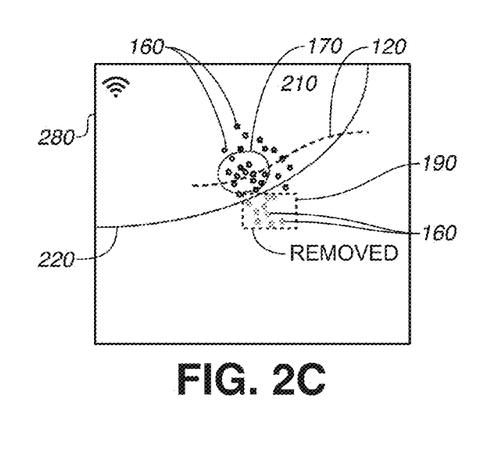

FIGS. 2A-2C are a set of drawings showing update and decision steps performed by the processor in a particle filter cycle in which the update step uses a network analysis. FIG. 2A shows a picture 200 prior to the beginning of a particle filter cycle of a mobile robot in an initial position 110, moving along an estimated trajectory 120. Also shown are a network region 210 that is bounded by a network boundary 220, and a number of particle poses 140.

FIG. 2B shows a picture 250 at a first step of the cycle, namely an update step, wherein the pose 140 of at least one particle for the robot in its initial position 110, moving along the estimated trajectory 120, is updated to updated pose 160 based on the odometry of the robot in an updated position 170 and optionally based on noise generated by a model. Preferably, the pose 140 of each particle for the robot in its initial position 110 is updated to updated poses 160 based on the odometry of the robot and optionally based on noise generated by the model. Also shown are the network region 210 and the network region boundary 220.

FIG. 2C shows the second step of the particle filter cycle, wherein particles are eliminated that are in regions wherein an existing network was not detected. The third resampling step is not shown here.

FIG. 2C shows a picture 280 at a second step of the particle filter cycle, wherein particles 190 are eliminated from the updated particle poses 160 for the robot's updated position 170, as it moves along the estimated trajectory 120. The eliminated particles 190 comprise those updated particle poses 160 that are located in regions where an existing network 210 was not detected because the eliminated particles 190 are on the far side of the network region boundary 220.

For example, a decision criterion comprises a network analysis. The network analysis comprises comparing existing networks to networks observed by the robot. For example, the particle is retained if a network that is sensed by the robot does exist at the pose of the particle. For example, the particle is eliminated if the network that is sensed by the robot that does not exist at the pose of the particle. For example, the network is a wireless network. For example, the network is a wifi network. For example, the network is an RFID network.

For example, the third step in the cycle of the particle filter comprises a resampling step. For example, the resampling step comprises resampling the particles so as to maintain enough particles for the particle filter to function. For example, the resampling step comprises resampling the particles so as to maintain enough particles for the particle filter to function at a predetermined level of effectiveness. For example, the filter samples new particles to be added to the previously retained particles.

For example, the filter samples new particles selected from a distribution having desired characteristics. For example, the filter samples new particles selected from a substantially Gaussian distribution having desired characteristics. For example, the filter samples new particles having a mean related in a desired way to a mean of the retained particles. For example, the filter samples new particles having a mean approximately equal to the mean of the retained particles. For example, the filter samples new particles having a covariance related in a desired way to a covariance of the retained particles. For example, the filter samples new particles having a covariance approximately equal to the covariance of the retained particles.

For example, a decision criterion comprises a known object analysis. The known object analysis comprises comparing existing known objects to known objects observed by the robot. For example, the particle is eliminated if a known object is sensed by a robot that does not exist at the pose of the particle. For example, the particle is retained if a known object is sensed by a robot that does exist at the pose of the particle. For example, the known object may comprise one or more of a charging dock, a piece of office furniture, a robotic workcell, and another known object.

According to still further embodiments of the invention, the sampling step may comprise a weighting sub-step. For example, two or more particles are weighted using weights that are all substantially equal. According to other embodiments of the invention, two or more particles are weighted using weights that are not all substantially equal. For example, at least one of the weights is derived using a correlation between sensed network strength and a predicted network strength. For example, at least one of the weights is derived using a correlation between sensed wireless network strength and predicted wireless network strength. For example, at least one of the weights is derived using one or more of a sensed presence of one or more known objects and a sensed absence of one or more known objects.

For example, at least one of the weights is derived using one or more of a sensed presence of one or more environmental signs and a sensed absence of one or more environmental signs. For example, at least one of the weights is derived using one or more of a sensed presence in a predicted map area of one or more environmental signs and a sensed absence in a predicted map area of one or more environmental signs. For example, the environmental sign comprises one or more of a fiducial, an aisle number, a row number, a magnetic field, an electric field, and another environmental sign. For example, one or more of the presence and the absence of a magnetic field is detected by a magnetometer and is stored in a map.

For example, respective weights of at least two particles are used to help determine which particles should be eliminated from the particle filter.

Figure 3:
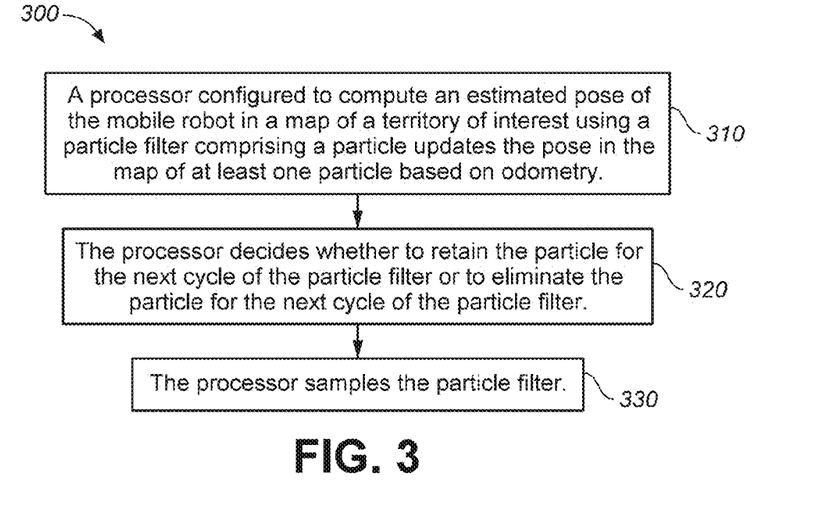
FIG. 3 is a flow chart of a method for localization of robots.

FIG. 3 is a flow chart of a method 300 for localization of robots.

The order of the steps in the method 300 is not constrained to that shown in FIG. 3 or described in the following discussion. Several of the steps could occur in a different order without affecting the final result.

In block 310, a processor configured to compute an estimated pose of the mobile robot in a map of a territory of interest using a particle filter comprising a particle updates the pose in the map of at least one particle based on odometry. Preferably, but not necessarily, the pose of each particle is updated based on odometry. Block 310 then transfers control to block 320.

In block 320, the processor decides whether to retain the particle for the next cycle of the particle filter or to eliminate the particle for the next cycle of the particle filter. Block 320 then transfers control to block 330.

In block 330, the processor samples the particle filter. Block 330 then terminates the process.

Figure 4:
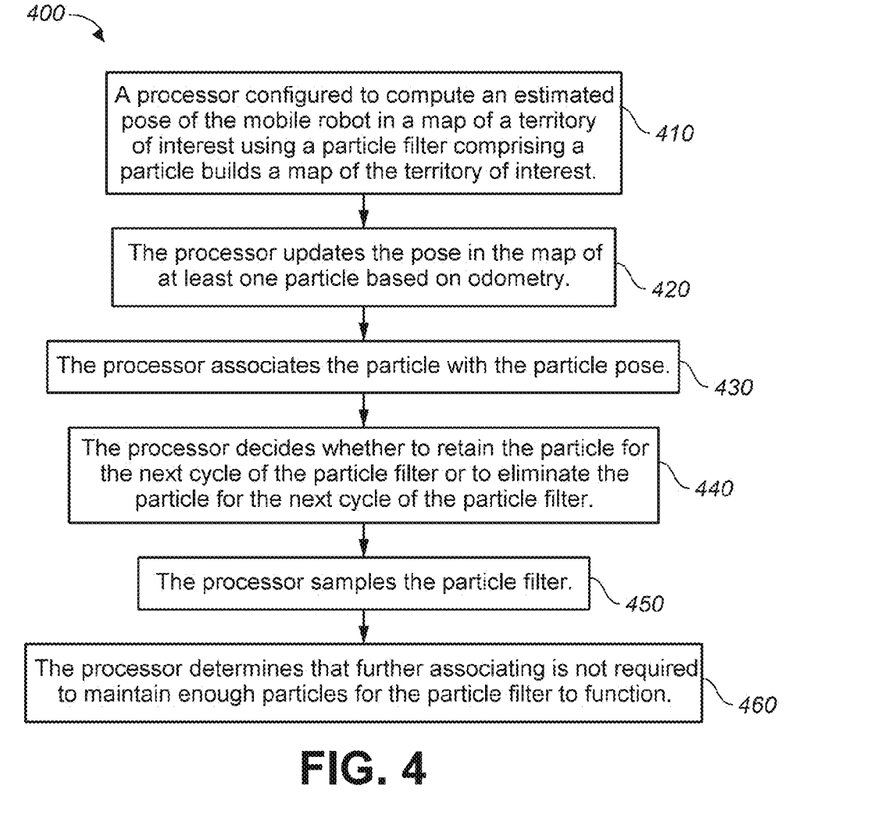
FIG. 4 is a flow chart of a method for localization of robots.

FIG. 4 is a flow chart of a method 400 for localization of robots.

The order of the steps in the method 400 is not constrained to that shown in FIG. 4 or described in the following discussion. Several of the steps could occur in a different order without affecting the final result.

In block 410, a processor configured to compute an estimated pose of the mobile robot in a map of a territory of interest using a particle filter comprising a particle builds a map of the territory of interest. Block 410 then transfers control to block 420.

In block 420, the processor updates the pose in the map of at least one particle based on odometry. Preferably, but not necessarily, the pose of each particle is updated based on odometry. Block 420 then transfers control to block 430.

In block 430, the processor associates the particle with the particle pose. Block 430 then transfers control to block 440.

In block 440, the processor decides whether to retain the particle for the next cycle of the particle filter or to eliminate the particle for the next cycle of the particle filter. Block 440 then transfers control to block 450.

In block 450, the processor samples the particle filter. Block 450 then transfers control to block 460.

In block 460, the processor determines that further associating is not required to maintain enough particles for the particle filter to function. Block 460 then terminates the process.

According to further embodiments of the invention, the map may be built using techniques in Simultaneous Mapping and Localization (SLAM), such as updating particle filters using one or more of odometry and scanning laser range finders. For example, the map may comprise a heat map of one or more sensed networks. For example, the map may comprise a heat map of one or more sensed wireless networks. For example, the map may comprise a location of one or more known objects. For example, the known object may comprise one or more of a charging dock, a piece of office furniture, a robotic workcell, and another known object.

According to still other embodiments of the invention, a location of one or more known objects may be included in the map by allowing a robotic perception module to detect the one or more known objects during the building of the map. For example, the location of one or more known objects may be included in the map by allowing the robotic perception module to add the location after map building using stored data. For example, the location of one or more known objects may be included in the map by allowing human annotators to manually add the location using an interface.

According to further embodiments of the invention, component map data sets provided by at least two robots may be consolidated to form an integrated map. For example, the integrated map is more accurate than an individual component map data set.

According to further embodiments of the invention, robots may update the map at runtime. For example, if a new wireless network is detected, the robot can add it to the map based on its current best estimate of robot pose. For example, if a feature (for instance, a sensed object or sensed wireless network) causes a large majority of the present particles of the filter to be reduced in weight or potentially eliminated, the robot may evaluate particles instead without that feature. For example, the robot may mark said features as potentially incorrect in the map, and may remove them from the map entirely.

According to further embodiments of the invention, the obstacle map may be updated using other sensed data. For example, a scanning laser range finder or depth camera may be used to clear out mapped obstacles that are no longer present in the real world.

According to further embodiments of the invention, two or more robots may pool their map updates to build a better updated map. For example, at least one of the two or more robots may store a second map that comprises differences it has sensed from the original map. For example, these difference maps may then be collected by a wirelessly connected server or a program running on one of the two or more robots and used to determine which updates have strong correlation between the one or more robots. For example, at least one of the update step, the decision step, and the resampling step is performed by the robot-level microprocessor instead of by the processor.

For example, it will be understood by those skilled in the art that software used by the system and method for localization of robots may be located in any location in which it may be accessed by the system. It will be further understood by those of skill in the art that the number of variations of the network, the location of the software, and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention. For example, the processor may be replaced by a computer.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for localization of robots in a territory of interest, comprising:
    updating, by a processor configured to compute an estimated pose of a mobile robot in a map of a territory of interest using a particle filter comprising a particle, a pose in the map of the particle, the particle filter comprising all particles retained from a previous cycle;
    deciding, by the processor, whether to retain the particle for a next cycle of the particle filter or to eliminate the particle for the next cycle of the particle filter, wherein deciding further comprises applying a decision criterion comprising an obstacle analysis;
    and sampling the particle filter, by the processor, so as to achieve localization of robots in a territory of interest, wherein the map comprises a heat map of one or more networks sensed by the robots.

2. The method of claim 1, wherein updating comprises building the map using techniques in Simultaneous Mapping and Localization (SLAM).

3. The method of claim 1, wherein the map comprises a heat map of one or more sensed networks.

4. A method for localization of robots in a territory of interest, comprising:
    updating, by a processor configured to compute an estimated pose of a mobile robot in a map of a territory of interest using a particle filter comprising a particle, a pose in the map of the particle, the particle filter comprising all particles retained from a previous cycle;
    deciding, by the processor, whether to retain the particle for a next cycle of the particle filter or to eliminate the particle for the next cycle of the particle filter, wherein deciding further comprises applying a decision criterion comprising an obstacle analysis;
and sampling the particle filter, by the processor, so as to achieve localization of robots in a territory of interest, wherein the map comprises a location of one or more known objects.

5. The method of claim 4, wherein the known object comprises one or more of a charging dock, a piece of office furniture, a robotic workcell, and another known object.

6. The method of claim 4, wherein the map comprises a location of one or more known objects.

7. The method of claim 6, wherein the location of the one or more known objects is included in the map by allowing a robotic perception module to detect the one or more known objects during the building of the map.

8. The method of claim 6, wherein the location of the one or more known objects is included in the map by allowing the robotic perception module to add the location after map building using stored data.

9. The method of claim 6, wherein the location of the one or more known objects is included in the map by allowing human annotators to manually add the location using an interface.

10. The method of claim 1, wherein the step of updating is performed at runtime.

11. The method of claim 1, wherein the step of updating further comprises using sensed data.

12. The method of claim 1, wherein the step of updating further comprises adding a new network to the map based on a current best estimate of robot pose.

13. The method of claim 1, wherein the step of updating further comprises pooling map updates, by two or more robots.

14. The method of claim 13, wherein the step of updating further comprises storing, by at least one of the two or more robots, a second map comprising differences sensed from the original map.

15. The method of claim 14, wherein the step of updating further comprises collecting the difference maps.

16. The method of claim 15, where the step of updating comprises determining which updates have strong correlation between the one or more robots.

17. The method of claim 1, wherein the step of updating is performed based on an odometry measurement of the robot.

18. The method of claim 1, wherein the step of updating is performed using one or more of a scanning laser range finder and depth camera to clear out a mapped obstacles that is no longer present in the real world.

19. The method of claim 1, wherein the step of updating further comprises predicting Gaussian noise.

20. The method of claim 1, wherein the step of updating further comprises leaving a particle in place based on the odometry measurement of the robot.

21. The method of claim 1, wherein the step of updating further comprises associating a particle in a particle filter with the particle pose.

22. A method for localization of robots in a territory of interest, comprising:
updating, by a processor configured to compute an estimated pose of a mobile robot in a map of a territory of interest using a particle filter comprising a particle, a pose in the map of the particle, the particle filter comprising all particles retained from a previous cycle;
deciding, by the processor, whether to retain the particle for a next cycle of the particle filter or to eliminate the particle for the next cycle of the particle filter, wherein deciding further comprises applying a decision criterion comprising an obstacle analysis; and
sampling the particle filter, by the processor, so as to achieve localization of robots in a territory of interest, wherein the step of deciding further comprises removing particles that pass through obstacles.

23. The method of claim 1, wherein the step of deciding further comprises removing particles where a wireless network should not be seen.

24. The method of claim 1, wherein the particle pose comprises information regarding one or more of a pose of the robot in three-dimensional space and an orientation of the robot in three-dimensional space.

25. The method of claim 24, wherein the particle pose further comprises a quaternion describing one or more of the robot's roll, pitch, and yaw.

26. The method of claim 1, wherein the territory of interest comprises an obstacle.

27. The method of claim 26, wherein the obstacle comprises a wall.

28. The method of claim 1, wherein the map comprises network data.

29. The method of claim 1, wherein deciding further comprises applying two decision criteria.

30. The method of claim 29, wherein one of the decision criteria comprises an obstacle analysis.

31. The method of claim 30, wherein the obstacle analysis comprises comparing the particle to the map, so as to determine whether the particle has passed through one or more of a wall and another obstacle.

32. The method of claim 31, wherein if the particle has passed through the one or more of a wall and another obstacle, deciding comprises eliminating the particle.

33. The method of claim 31, wherein if the particle has not passed through the one or more of a wall and another obstacle, deciding comprises retaining the particle.

34. The method of claim 30, wherein the obstacle analysis comprises computation of whether a point is in contact with an obstacle.

35. The method of claim 34, wherein the computation of whether a point is in contact with an obstacle becomes a determination whether a point representing the center of the robot lies inside a bounding volume, the bounding volume comprising a radius of the obstacle inflated by the radius of the mobile robot base.

36. The method of claim 30, wherein the obstacle analysis comprises inflating a size of one or more obstacles.

37. The method of claim 36, wherein the obstacle analysis comprises inflating the size of the one or more obstacles by an approximate radius of a base of the mobile robot.

38. The method of claim 29, wherein one of the decision criteria comprises a network analysis.

39. The method of claim 38, wherein the network analysis comprises comparing existing networks to networks observed by the robot.

40. The method of claim 39, wherein if a network that is sensed by the robot does not exist at the pose of the particle, deciding comprises eliminating the particle.

41. The method of claim 39, wherein if the network that is sensed by the robot does exist at the pose of the particle, deciding comprises retaining the particle.

42. The method of claim 29, wherein one of the decision criteria comprises a known object analysis.

43. The method of claim 42, wherein the known object analysis comprises comparing existing known objects to known objects observed by the robot.

44. The method of claim 43, wherein if a known object is sensed by a robot that does not exist at the pose of the particle, deciding comprises eliminating the particle.

45. The method of claim 43, wherein if a known object is sensed by a robot that does exist at the pose of the particle, deciding comprises retaining the particle.

46. The method of claim 1, wherein sampling comprises sampling the particles so as to maintain enough particles for the particle filter to function.

47. The method of claim 46, wherein sampling further comprises sampling the particles so as to maintain enough particles for the particle filter to function at a predetermined level of effectiveness.

48. The method of claim 1, wherein sampling comprises sampling new particles to be added to the retained particles.

49. The method of claim 1, wherein sampling comprises sampling new particles selected from a distribution having desired characteristics.

50. The method of claim 49, wherein sampling comprises sampling new particles selected from a substantially Gaussian distribution having desired characteristics.

51. The method of claim 1, wherein sampling comprises sampling new particles having a mean related in a desired way to the mean of the retained particles.

52. The method of claim 51, wherein sampling comprises sampling new particles having a mean approximately equal to a mean of the retained particles.

53. The method of claim 1, wherein sampling comprises sampling new particles having a covariance related in a desired way to the covariance of the retained particles.

54. The method of claim 53, wherein sampling further comprises sampling new particles having a covariance approximately equal to a covariance of the retained particles.

55. The method of claim 1, wherein the sampling step comprises a sub-step of weighting two or more particles.

56. The method of claim 55, wherein the sub-step of weighting comprises evaluating a particle without a feature if the feature causes a large majority of the present particles of the filter to be reduced in weight.

57. The method of claim 56, wherein the feature comprises one or more of a sensed object and a sensed network.

58. The method of claim 55, wherein the sub-step of weighting comprises weighting two or more particles using weights that are all substantially equal.

59. The method of claim 55, wherein the sub-step of weighting comprises weighting two or more particles using weights that are not all substantially equal.

60. The method of claim 55, wherein the sub-step of weighting comprises deriving at least one of the weights using a correlation between sensed network strength and predicted network strength.

61. The method of claim 55, wherein the sub-step of weighting comprises deriving at least one of the weights using one or more of a sensed presence of one or more known objects and a sensed absence of one or more known objects.

62. The method of claim 55, wherein the sub-step of weighting comprises deriving at least one of the weights using one or more of a sensed presence of one or more environmental signs and a sensed absence of one or more environmental signs.

63. The method of claim 62, wherein the sub-step of weighting further comprises deriving at least one of the weights using one or more of a sensed presence in a predicted map area of an environmental sign and a sensed absence in a predicted map area of an environmental sign.

64. The method of claim 63, wherein the environmental sign comprises one or more of a fiducial, an aisle number, a row number, a magnetic field, an electric field, and another environmental sign.

65. The method of claim 55, wherein the sub-step of weighting comprises using respective weights of at least two particles to help determine which particles should be eliminated from the particle filter.

66. The method of claim 1, wherein at least one of updating, deciding, and sampling is performed by a microprocessor comprised in an actuator instead of by the processor.

67. A method for localization of robots in a territory of interest, comprising:
building, by a processor configured to compute an estimated pose of a mobile robot in a territory of interest using a particle filter comprising a particle, a map of the territory of interest, the particle filter comprising all particles retained from a previous cycle;
updating, by the processor, a pose of the particle in the map;
associating, by the processor, the particle with the particle pose;
deciding, by the processor, whether to retain the particle for a next cycle of the particle filter or to eliminate the particle for the next cycle of the particle filter, wherein deciding further comprises applying a decision criterion comprising data from a network sensor configured to sense one or more of presence and strength of a network;
sampling the particle filter, by the processor; and
determining, by the processor, that further associating of the particle with the particle pose is not required to maintain enough particles for the particle filter to function, so as to achieve localization of robots in a territory of interest.

68. The method of claim 67, wherein the sampling step comprises weighting two or more particles.

69. The method of claim 68, wherein weighting comprises deriving at least one of the weights using a correlation between sensed network strength and predicted network strength.

70. The method of claim 68, wherein weighting comprises deriving at least one of the weights using one or more of a sensed presence of one or more known objects and a sensed absence of one or more known objects.

71. The method of claim 68, wherein weighting comprises deriving at least one of the weights using one or more of a sensed presence of one or more environmental signs and a sensed absence of one or more environmental signs.

72. The method of claim 71, wherein weighting further comprises deriving at least one of the weights using one or more of a sensed presence in a predicted map area of an environmental sign and a sensed absence in a predicted map area of an environmental sign.

73. The method of claim 72, wherein the environmental sign comprises one or more of a fiducial, an aisle number, a row number, a magnetic field, an electric field, and another environmental sign.

74. The method of claim 68, wherein weighting comprises using respective weights of at least two particles to help determine which particles should be eliminated from the particle filter.

75. A system for localization of robots in a territory of interest, comprising:
a mobile robot comprising a processor, the mobile robot further comprising an actuator; and a sensor configured to measure the movement of the mobile robot, wherein the actuator comprises a microprocessor equipped with a program configured to execute steps in a particle-based method for robot localization, the steps comprising:

updating, by the processor, a pose in a map of the particle, the particle filter comprising all particles retained from a previous cycle;

deciding, by the processor, whether to retain the particle for a next cycle of a particle filter or to eliminate the particle for the next cycle of the particle filter, wherein deciding further comprises applying a decision criterion comprising data from a network sensor configured to sense one or more of presence and strength of a network; and sampling the particle filter, by the processor, so as to achieve localization of robots in a territory of interest.

76. The system of claim 75, wherein the mobile robot comprises the sensor.

77. The system of claim 75, wherein the sensor comprises a device configured to measure the movement of the mobile robot using odometry.

78. The system of claim 75, wherein the mobile robot comprises one or more wheels.

79. The system of claim 78, wherein the sensor is configured to measure movement of one or more of the one or more the wheels.

80. The system of claim 75, wherein the robot comprises an actuator motor configured to move the actuator.

81. The system of claim 80, wherein the actuator motor is mechanically attached to the actuator.

82. The system of claim 80, wherein the actuator motor is remotely activated using one or more of a belt and a non-belt power transmission device.

83. The system of claim 75, wherein the actuator comprises a feedback mechanism configured to provide feedback to the actuator.

84. The system of claim 83, wherein the actuator feedback comprises one or more of information regarding a position of the actuator, information regarding a force on the actuator, information regarding a position of the actuator, information regarding the operation of the actuator, and other actuator feedback.

85. The system of claim 83, wherein the feedback mechanism comprises one or more of a torque sensor and a tactile sensor.

86. The system of claim 75, wherein the actuator comprises one or more of an appendage, an appendage joint, and a wheel.

87. The system of claim 86, wherein the appendage comprises one or more of an arm, a leg, and another appendage.

88. The system of claim 75, wherein the actuator comprises a microprocessor.

89. The system of claim 88, wherein the microprocessor is operably connected with the processor.

90. The system of claim 88, wherein the microprocessor is configured to compute a predicted movement of the actuator.

91. The system of claim 75, wherein the robot comprises a network sensor configured to sense one or more of presence and strength of a network.

92. The system of claim 91, wherein the processor comprises the network sensor.

93. The system of claim 91, wherein the network sensor is configured to sense presence of a wireless network.

* * * * *

UNITED STATES PATENT AND TRADEMARK OFFICE
CERTIFICATE OF CORRECTION

PATENT NO. : 9,927,814 B2
APPLICATION NO. : 15/082488
DATED : March 27, 2018
INVENTOR(S) : Wise et al.

It is certified that error appears in the above-identified patent and that said Letters Patent is hereby corrected as shown below:

On the Title Page

Item (60), please add a "Related U.S. Application Data" section as follows:
"Provisional application No. 62/139,686, filed on March 28, 2015."

Signed and Sealed this
Twenty-third Day of August, 2022

Katherine Kelly Vidal
*Director of the United States Patent and Trademark Office*